US008583431B2

(12) United States Patent
Furman et al.

(10) Patent No.: US 8,583,431 B2
(45) Date of Patent: Nov. 12, 2013

(54) COMMUNICATIONS SYSTEM WITH SPEECH-TO-TEXT CONVERSION AND ASSOCIATED METHODS

(75) Inventors: William N. Furman, Fairport, NY (US); John W. Nieto, Rochester, NY (US); Marcelo De Risio, Penfield, NY (US)

(73) Assignee: Harris Corporation, Melbourne, FL (US)

( * ) Notice: Subject to any disclaimer, the term of this patent is extended or adjusted under 35 U.S.C. 154(b) by 211 days.

(21) Appl. No.: 13/217,819

(22) Filed: Aug. 25, 2011

(65) Prior Publication Data
US 2013/0054237 A1     Feb. 28, 2013

(51) Int. Cl.
*G10L 15/26*     (2006.01)

(52) U.S. Cl.
USPC ..... 704/235; 704/270; 379/88.13; 379/88.22; 379/93.13; 379/88.17; 455/466; 455/412.1; 455/413; 709/206; 709/207; 709/219

(58) Field of Classification Search
USPC .......... 379/88.13, 88.22, 88.14, 88.11, 88.17, 379/93.13, 88.18, 88.16, 88.01, 100.13; 704/270, 235, 251, 231, 260; 455/466, 455/412.1, 413; 709/206, 207, 219
See application file for complete search history.

(56) References Cited

U.S. PATENT DOCUMENTS

| | | | | |
|---|---|---|---|---|
| 5,724,410 | A * | 3/1998 | Parvulescu et al. | 379/88.18 |
| 5,903,625 | A * | 5/1999 | May | 379/21 |
| 6,163,536 | A * | 12/2000 | Dunn et al. | 370/352 |
| 6,163,765 | A * | 12/2000 | Andric et al. | 704/204 |
| 6,167,376 | A | 12/2000 | Ditzik | 704/235 |
| 6,198,808 | B1 * | 3/2001 | Martin | 379/88.14 |
| 6,219,638 | B1 * | 4/2001 | Padmanabhan et al. | 704/235 |
| 6,366,882 | B1 | 4/2002 | Bijl et al. | 704/235 |
| 6,385,586 | B1 | 5/2002 | Dietz | 704/277 |
| 6,934,756 | B2 * | 8/2005 | Maes | 709/227 |
| 7,117,152 | B1 | 10/2006 | Mukherji et al. | |
| 7,286,658 | B1 | 10/2007 | Henderson | 379/142.04 |
| 2004/0143430 | A1 | 7/2004 | Said et al. | 704/2 |
| 2005/0010407 | A1 | 1/2005 | Jaroker | 704/235 |
| 2006/0041431 | A1 * | 2/2006 | Maes | 704/270.1 |
| 2006/0217159 | A1 | 9/2006 | Watson | 455/563 |
| 2009/0326939 | A1 | 12/2009 | Toner et al. | 704/234 |

FOREIGN PATENT DOCUMENTS

GB        2382208         5/2003

OTHER PUBLICATIONS

Brooks "*Google New Translation App Brings Speech-to-Text Translation to Your Cell Phone*" Printed Feb. 25, 2011.
"*New iphone App Translates Your Voice Into Text*" bnet.com/blog; Printed Feb. 25, 2011.

* cited by examiner

*Primary Examiner* — Vijay B Chawan
(74) *Attorney, Agent, or Firm* — Allen, Dyer, Doppelt, Milbrath & Gilchrist, P.A.

(57) ABSTRACT

A communications system includes a first communications device cooperating with a second communications device. The first communications device multiplexes a digital speech message and a corresponding text message into a multiplexed signal, and wirelessly transmits the multiplexed signal. The second communications device wirelessly receives the multiplexed signal, de-multiplexes the multiplexed signal digital into the speech message and the corresponding text message, decodes the speech message for an audio output transducer, and operates a text processor on the corresponding text message for display. The corresponding text message is displayed in synchronization with the speech message output by the audio output transducer. A memory is coupled to the text processor for storing the text message, and the text processor is configured to display the stored text message.

20 Claims, 4 Drawing Sheets

COMMUNICATIONS SYSTEM WITH SPEECH-TO-TEXT CONVERSION AND ASSOCIATED METHODS

FIELD OF THE INVENTION

The present invention relates to the field of wireless communications, and more particularly, to voice over wireless communications devices.

BACKGROUND OF THE INVENTION

Wireless communications devices transporting voice allows multiple parties to remain in contact with one another when deployed in the field. These devices typically use low rate voice encoders (i.e., vocoders) to robustly transmit digital speech to a receiver. On the receive side, low rate voice decoders are used to convert the digital speech back to analog speech.

In noisy environments, the receiving party may have a difficult time hearing the speech message from the transmitting party. This means that the receiving party would have to ask for the speech message to be resent. If the link between the transmitting and receiving party is lost and cannot be reconnected, then the receiving party simply misses out on the speech message. In certain situations the loss of a speech message providing command and control information may be critical. Consequently, there is a need to improve the reliability of the voice link between the transmitting party and the receiving party.

One approach to addressing this problem is disclosed in U.S. Pat. No. 2006/0217159 which provides a wireless communications device that may be selectively operated in one of a voice-to-text operating mode and an audible operating mode. In the voice-to-text operating mode, a speech-to-text converter is used for converting a received speech message to a corresponding text message which is then sent to a display for viewing by the receiving party. Operation in the voice-to-text operating mode may be based on a comparison of a measured ambient noise level and a predetermined threshold. Alternatively, a control signal for selecting the voice-to-text operating mode may be received over an air interface. A disadvantage of this approach is that selection of the voice-to-text operating mode may occur after the receiving party has already missed hearing a received speech message. A secondary disadvantage is that most users have a need to hear the audio in order to recognize the speaker on the other end.

SUMMARY OF THE INVENTION

In view of the foregoing background, it is therefore an object of the present invention to improve the reliability of a voice link in wireless communications devices.

This and other objects, features, and advantages in accordance with the present invention are provided by a communications system comprising a first communications device and a second communications device cooperating therewith.

The first communications device comprises an audio input transducer, and a voice encoder coupled to the audio input transducer and configured to encode a speech message. A speech-to-text converter is coupled to the audio input transducer and configured to convert the speech message into a corresponding text message. A multiplexer is coupled to the voice encoder and to the speech-to-text converter, and a wireless transmitter is coupled to the multiplexer. The multiplexer is operable to multiplex the speech message and the text message into a multiplexed signal, and the wireless transmitter is operable to transmit the combined (i.e., multiplexed) signal.

The second communications device comprises a wireless receiver configured to receive the multiplexed signal from the wireless transmitter, and a de-multiplexer is coupled to the wireless receiver and de-multiplexes the multiplexed signal into the speech message and the text message. A voice decoder is coupled to the de-multiplexer. An audio output transducer is coupled to the voice decoder and configured to output the speech message. A text processor is coupled to the de-multiplexer. A display is coupled to the text processor and is configured to display the corresponding text message in synchronization with the speech message. A memory is coupled to the text processor and is operative to store the corresponding text message, and the text processor is configured to display the stored text message. In addition, the received voice message can be stored in a memory and played along with the text message.

The reliability of a voice link in the above described communications system is advantageously improved based on a simultaneous transmission of the speech message and the corresponding text message, wherein reception of the text message is displayed for viewing. This is accomplished without requiring user input. In addition, there is advantageously a stored record of transmission of the speech message, and possibly the speech text, from the first communications device for later recall.

In noisy environments, the user operating the second communications device is still able to understand the speech message via display of the corresponding text message even if the speech message was not audible. The display thus serves as a backup to the voice link.

Another aspect is directed to a mobile wireless communications device comprising a transmitter section and a receiver section cooperating therewith. The transmitter and receiver sections advantageously support speech-to-text conversion as described above.

Yet another aspect of the invention is directed to a method for operating a communications system comprising first and second communications devices as described above. The first communications device is operated to perform at least the following: encoding an analog speech message to a digital speech message, converting the analog speech message into a corresponding text message, multiplexing the digital speech message and the corresponding text message into a multiplexed signal, and wirelessly transmitting the multiplexed signal.

The second communications device is operated to perform at least the following: wirelessly receiving the multiplexed signal, de-multiplexing the multiplexed signal into the digital speech message and the corresponding text message, decoding the speech message for an audio output transducer, operating a text processor on the corresponding text message for display. The corresponding text message is displayed in synchronization with the speech message output by the audio output transducer. In addition, the corresponding text message is stored, and the text processor can be operated to later display the stored corresponding text message, and optionally, the speech message too.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notations refer to an alternate embodiment.

Figure 1:
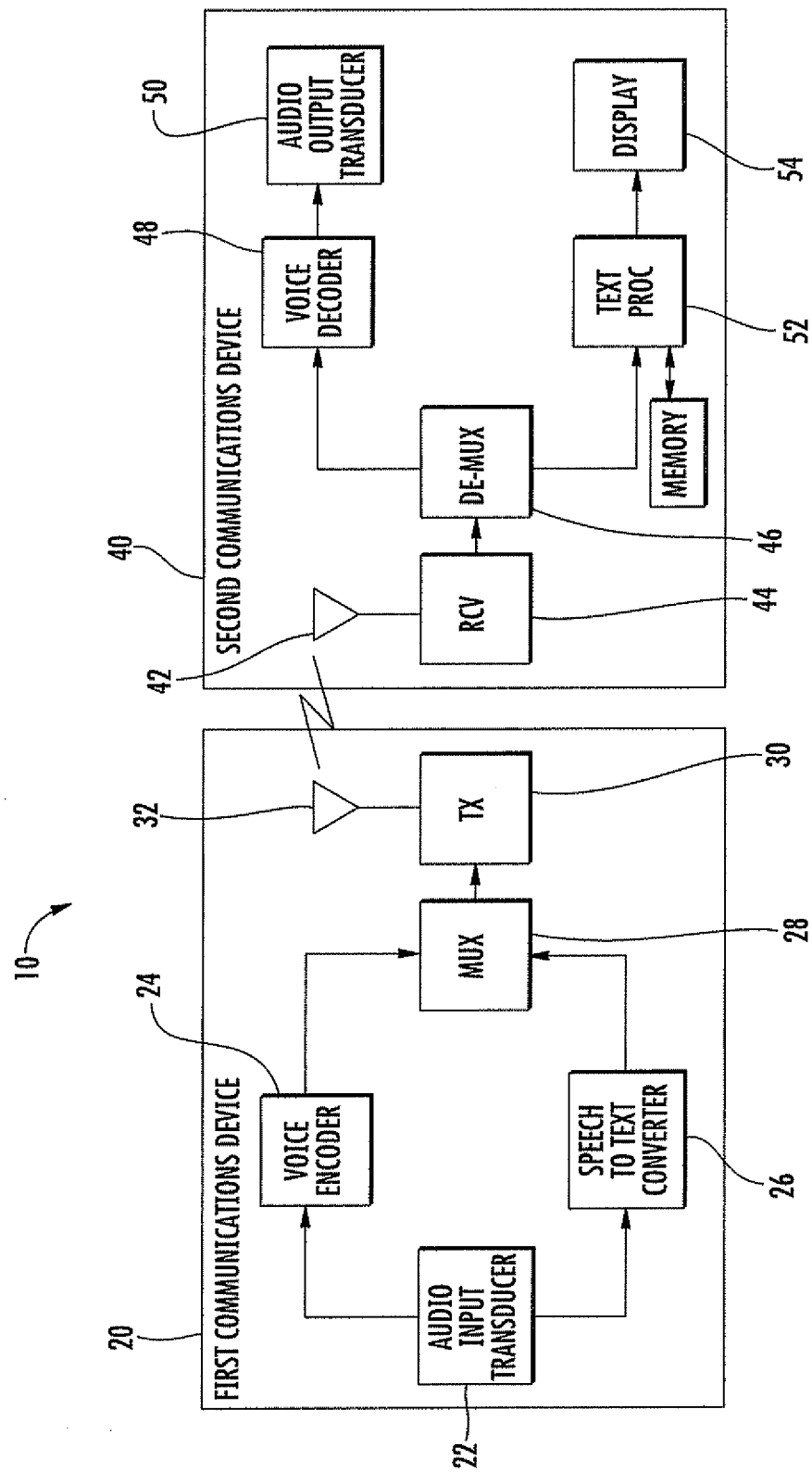
FIG. 1 is a block diagram of a wireless communications system in accordance with the present invention.

Referring now to FIG. 1, a wireless communications system 10 includes a first communications device 20 and a second communications device 40 cooperating therewith. Even though only first and second communications devices 20, 40 are illustrated, the wireless communications system 10 supports more than two communications devices, as readily appreciated by those skilled in the art.

The communications devices 20, 40 are configured to support both voice and data. Alternatively, the communications devices 20, 40 are configured to support voice-only.

The communications devices 20, 40 are intended to be deployed out in the field so that communications is maintained between different users, particularly in noisy environments. As will be explained in greater detail below, a speech message and a corresponding text message synchronized with the speech message are exchanged between the communications devices 20, 40 so that if the speech message is not audible by the receiving party, then the text message can be read, or both can be heard (speech) and read (text) simultaneously.

The first communications device 20 includes an audio input transducer 22, which may be a microphone, for example. A voice encoder 24 is coupled to the audio input transducer, and is configured to encode a speech message received by the audio input transducer 22. The voice encoder 24 may operate at 600 bits/second, 1200 bits/second or 2400 bits/second, for example. However, the voice encoder 24 is not limited to these bit rates.

A speech-to-text converter 26 is coupled to the audio input transducer 22. The speech-to-text converter 26 is configured to convert the speech message into a corresponding text message. The speech-to-text converter 26 operates at a lower rate than the voice encoder 24. The speech-to-text converter 26 may operate at 50 bits/second or 75 bits/second, for example. However, the speech-to-text converter 26 is not limited to these bit rates.

A multiplexer 28 is coupled to the voice encoder 24 and to the speech-to-text converter 26 to generate a multiplexed signal. The multiplexed signal includes the speech message digitized and the corresponding text message. In one embodiment, the multiplexer 28 is configured to substitute data bits from the speech-to-text converter 26 within a bit stream from the voice encoder 24. However, this may degrade performance of the voice encoder 24 since digital speech message bits are being thrown away to accommodate the text message.

In another embodiment, the multiplexer 28 is configured to append data bits from the speech-to-text converter 26 to the bit stream from the voice encoder 24. As readily appreciated by those skilled in the art, the multiplexing may take place before the transport (i.e., physical) layer. Optionally, the multiplexing may take place in the transport layer. When the multiplexing is performed at the transport layer, forward error correction (FEC) is being used. For example, the digital speech message may be at a rate of 2400 bps utilizing a rate ½ code in the physical layer (physical layer runs at 4800 bps). The rate ½ code is punctured to ⅔ so that 1200 bits are available to use for text message and text FEC. In this embodiment, puncturing does not throw away the original digital speech message bits. Instead, puncturing weakens the FEC used to protect the digital speech message.

In another embodiment, when forward error correction (FEC) is used for the physical layer waveform transporting digital voice, the FEC can be punctured so that digital voice and speech can be sent without increasing the data rate of physical layer waveform. In another embodiment, a weak FEC code or uncoded digital voice stream is multiplexed with a strongly FEC coded text message. In another embodiment, the multiplexing can take place in the physical layer waveform to allow more efficient use of a different FEC for speech and text, etc.

A wireless transmitter 30 is coupled to the multiplexer 28. The wireless transmitter 30 transmits a multiplexed signal from the multiplexer 28 over the airwaves via an antenna 32 coupled thereto.

The second communications device 40 includes an antenna 42 coupled to a wireless receiver 44 to receive the multiplexed signal transmitted by the first communications device 20. A de-multiplexer 46 is coupled to the wireless receiver 44.

A voice decoder 48 is coupled to the de-multiplexer 46. An audio output transducer 50, such as a speaker, is coupled to the voice decoder 48. A text processor 52 is coupled to the de-multiplexer 46. A display 54 is coupled to the text processor 52 and is configured to display the corresponding text message in synchronization with the speech message.

The communications system 10 advantageously allows a user operating the second communications device 40 to display the corresponding text message in synchronization with the speech message without requiring user input. In noisy environments, the user operating the second communications device 40 is still able to understand the speech message via the corresponding text message viewed on the display 54 even if the speech message was not audible. The display 54 thus serves as a backup to the voice link.

In addition, a memory 47 is coupled to the text processor 52 for storing the corresponding text message. This advantageously provides a stored record of transmission from the first communications device 20. In addition, the text processor 52 may be configured so that the user can cause the display 54 to display the saved corresponding text message. This advantageously allows the text message to be later recalled by the user. Depending on the size of the display, the text message may be scrolled, as readily understood by those skilled in the art. In addition, each text message that is recalled has a time and date stamp associated with it, as well as identity of the sender. Optionally, the speech message can also be stored and played back simultaneously with the speech text.

Figure 2:
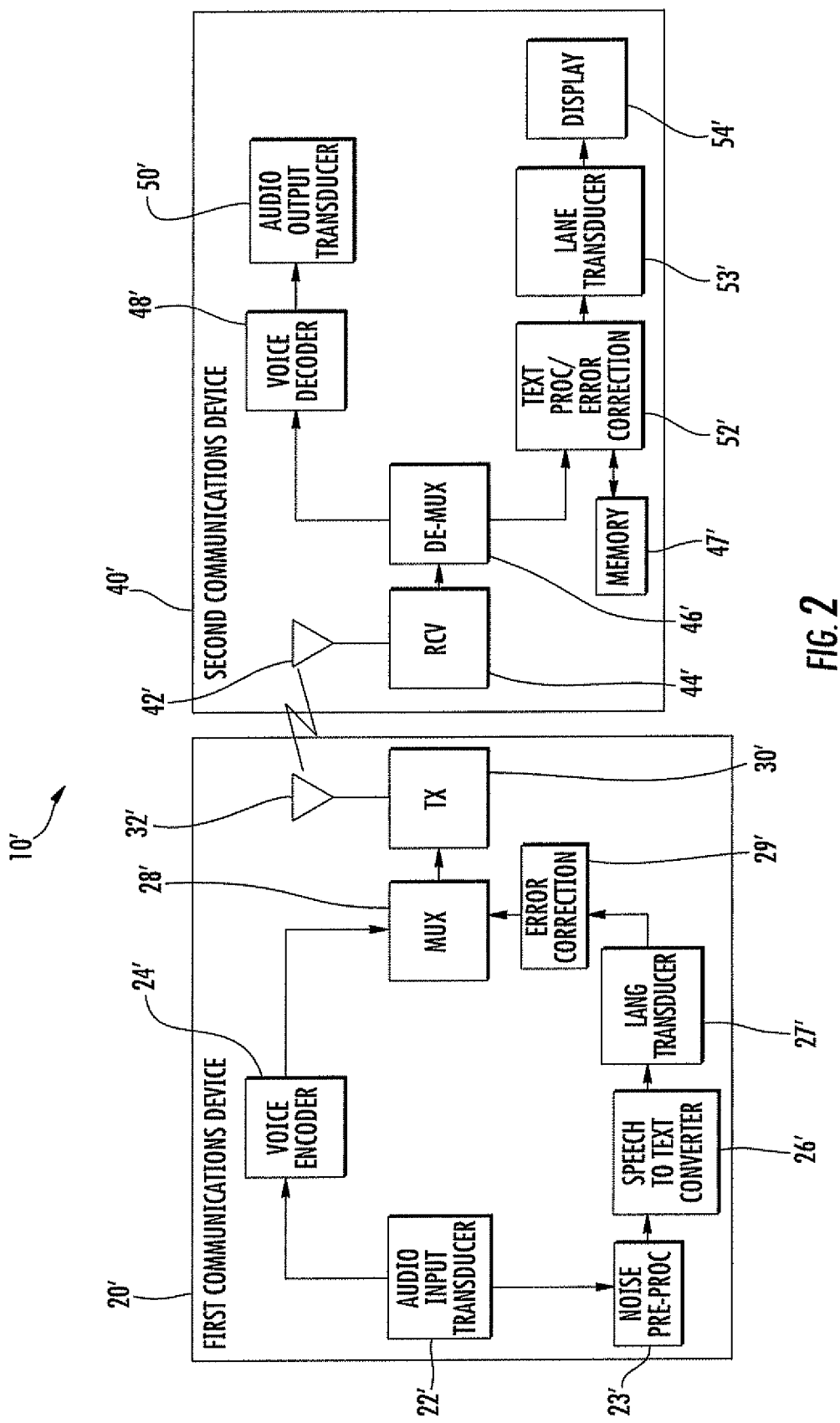
FIG. 2 is a block diagram of an alternate embodiment of a wireless communications system in accordance with the present invention.

Referring now to FIG. 2, an alternate embodiment of the wireless communications system 10' will be discussed. The first communications device 20' may further comprise a language converter 27' coupled between the speech-to-text converter 26' and the multiplexer 28'. Alternatively, the second communications device 40' may comprise a language converter 53' coupled between the text processor 52' and the display 54'.

Since the wireless communications devices 20', 40' may operate in a multi-language environment, the use of a language converter 27', 53' advantageously allows a user to at least be able to read a received text message in their native language while the corresponding speech message is audible in the sender's spoken language. This helps to improve communications among users from different nationalities. For example, the user operating the first communications device 20' is English, whereas the user operating the second communications device 40' is French. The language converter 27', 53' translates the text message from English to French. The language conversion may take place on the transmit side or the receive side.

The respective users of the wireless communications devices 20', 40' have the option of activating their respective language converter 27' or 53'. Each language converter 27', 53' may be configured to support one or more different languages which allow the user to select the desired language for viewing the text message. Optionally, the text message can be viewed in multiple languages simultaneously.

Optionally, the first communications device 20' selects which language to transmit. This determination may be made based on the language producing the smallest text message, for example. The corresponding translation is then made performed by the second communications device 40'.

In the first communications device 20', a noise pre-processor 23' is positioned between the audio input transducer 22' and the speech-to-text converter 26'. The noise pre-processor 23' is configured to remove background noise picked up by the audio input transducer 22'.

To further increase the robustness of the text message output by the receiving radio 54', error correction/detection may be used. For example, an error circuit 29' is coupled between the speech-to-text converter 26' and the multiplexer 28'. In the second communications device 40', an error circuit may also be included as part of the text processor 52'. The two error circuits cooperate with one another. The error circuits may operate based on forward error correction (FEC) and cyclic redundancy correction (CRC), for example.

Figure 3:
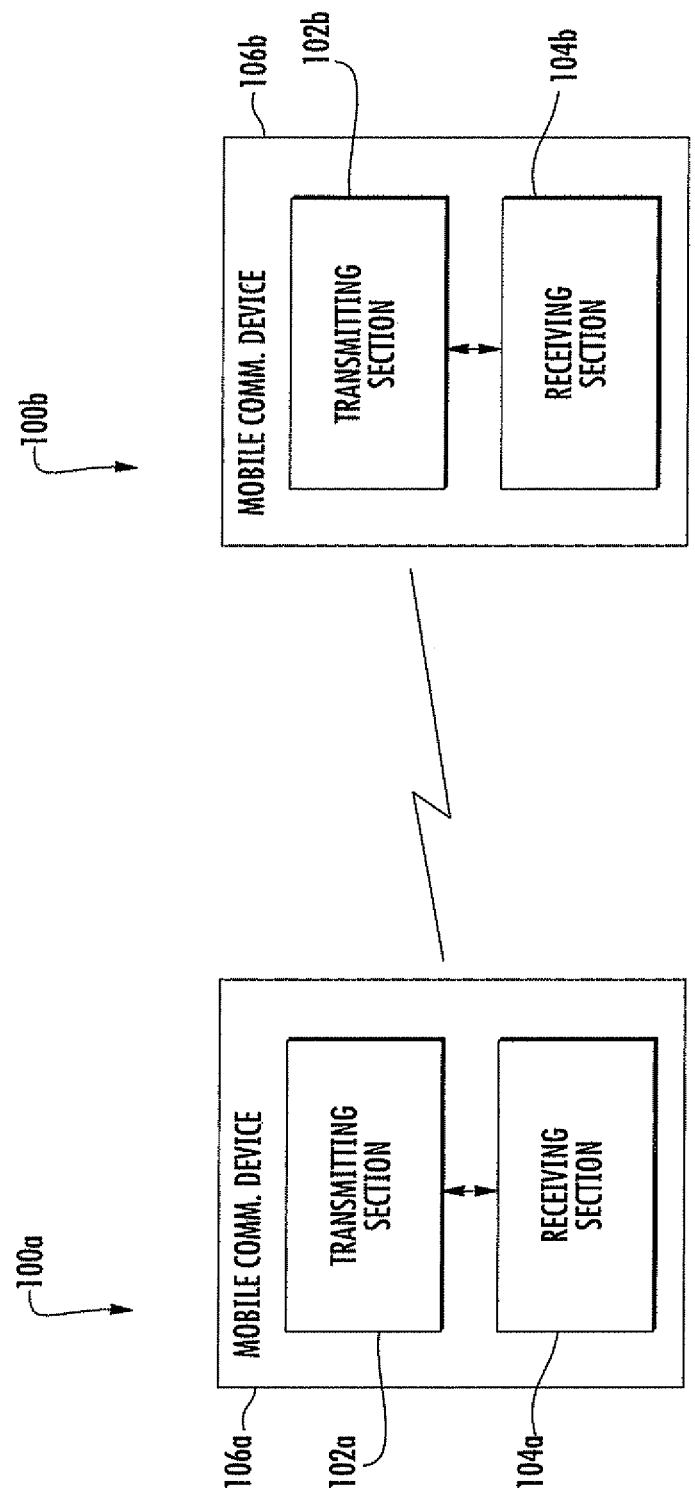
FIG. 3 is a top level block diagram of mobile wireless communications devices communicating with one another in accordance with the present invention.
Figure 4:
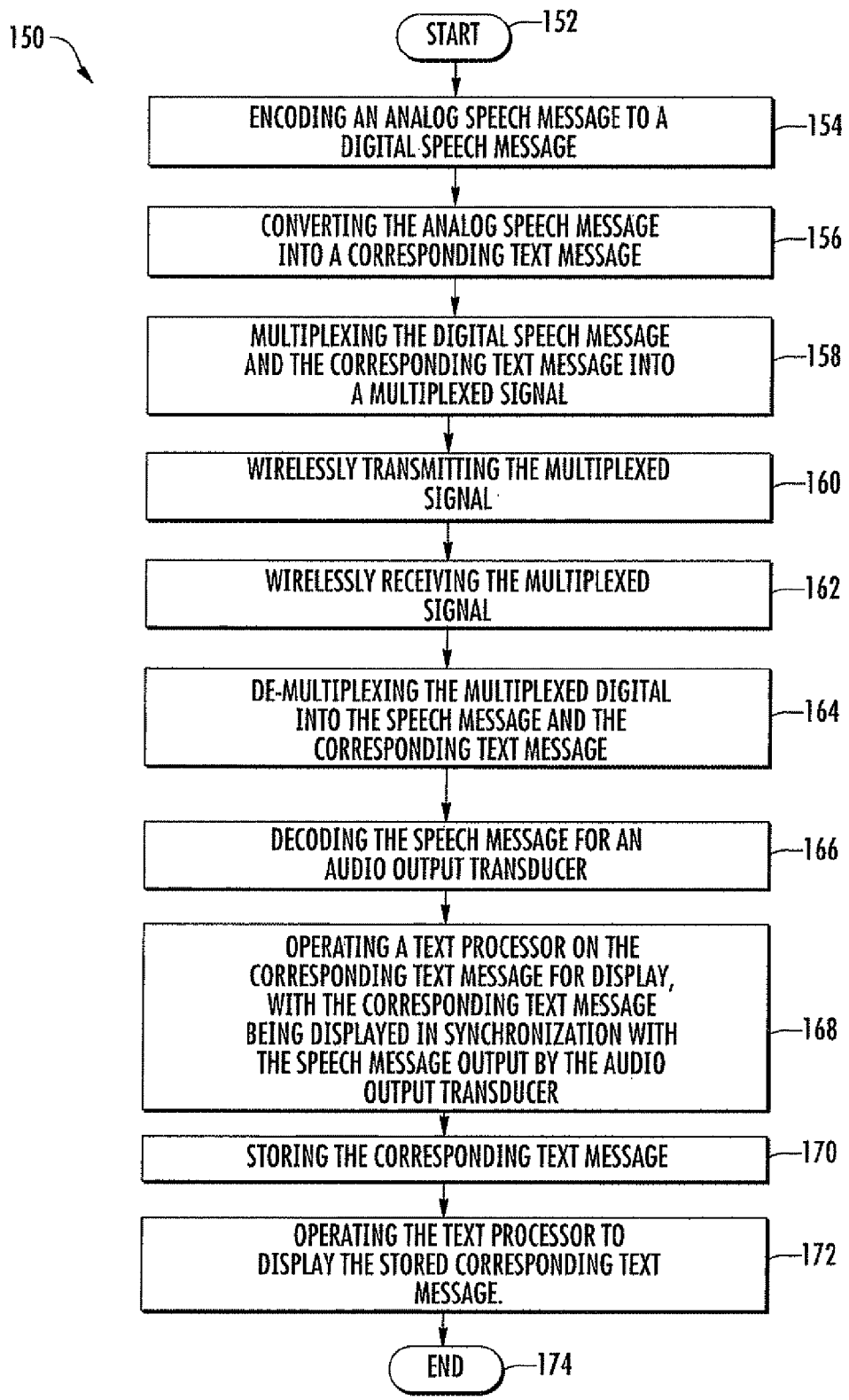
FIG. 4 is a block diagram illustrating a method for operating a wireless communications system in accordance with the present invention.

Another aspect is directed to wireless communications devices 100a, 100b that respectively include a transmitter section 102a, 102b and a receiver section 104a, 104b cooperating therewith, as illustrated in FIG. 3. A housing 106a, 106b carries the transmitter and receiver sections 102a, 104a and 102b, 104b.

The transmitter and receiver sections 102a, 104a and 102b, 104b within each mobile wireless communications device 100a, 100b advantageously supports speech-to-text conversion as described above. The mobile wireless communications devices 100a, 100b communicate with one another to exchange speech messages and their corresponding text messages as described above.

More particularly, each transmitter section 102a, 102b includes the components as illustrated in the first communications device 20, and transmits a multiplexed signal that includes both a speech message and a corresponding text message. Similarly, each receive section 104a, 104b includes the components as illustrated in the second communications device 40, and receives a multiplexed signal transmitted by a different communications device. The received multiplexed signal is then separated into the speech signal for the audio output transducer, and into the text message for display. The corresponding text message may be stored in a memory, and a text processor is configured to later display the stored text message.

A flowchart 150 illustrating a method for operating a communications system 10 comprising a first communications device 20 and a second communications device 40 cooperating therewith will now be described. From the Start (Block 152), the method comprises operating the first communications device 20 to perform the following: encoding an analog speech message to a digital speech message at Block 154, converting the analog speech message into a corresponding text message at Block 156, multiplexing the digital speech message and the corresponding text message into a multiplexed signal at Block 158, and wirelessly transmitting the multiplexed signal at Block 160.

The second communications device 40 is operated to perform the following: wirelessly receiving the multiplexed signal at Block 162, de-multiplexing the multiplexed signal into the digital speech message and the corresponding text message at Block 164, decoding the speech message for an audio output transducer at Block 166, and operating a text processor on the corresponding text message for display at Block 168. The corresponding text message is displayed in synchronization with the speech message output by the audio output transducer. The corresponding text message is also stored at Block 170, and the text processor is operated to display the stored corresponding text message at Block 172. The method ends at Block 174.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
a first communications device and a second communications device cooperating therewith, said first communications device comprising
an audio input transducer,
a voice encoder coupled to said audio input transducer and configured to encode a speech message,
a speech-to-text converter coupled to said audio input transducer and configured to convert the speech message into a corresponding text message,
a multiplexer coupled to said voice encoder and to said speech-to-text converter and operable to multiplex the speech message and the corresponding text message into a multiplexed signal, and
a wireless transmitter coupled to said multiplexer and operable to transmit the multiplexed signal;
said second communications device comprising
a wireless receiver configured to receive the multiplexed signal from said wireless transmitter,
a de-multiplexer coupled to said wireless receiver and operable to de-multiplex the multiplexed signal into the speech message and the corresponding text message,
a voice decoder coupled to said de-multiplexer,
an audio output transducer coupled to said voice decoder and configured to output the speech message,
a text processor coupled to said de-multiplexer,
a display coupled to said text processor and configured to display the corresponding text message in synchronization with the speech message, and a memory coupled to said text processor for storing the text message,
said text processor being configured to display the stored text message.

2. The communications system according to claim 1 wherein said first communications device further comprises a language converter coupled between said speech-to-text converter and said multiplexer.

3. The communications system according to claim 1 wherein said second communications device further comprises a language converter coupled between said text processor and said display.

4. The communications system according to claim 1 wherein said first communications device comprises a first error circuit coupled between said speech-to-text converter and said multiplexer.

5. The communications system according to claim 4 wherein said text processor comprises a second error circuit cooperating with said first error circuit.

6. The communications system according to claim 1 wherein said multiplexer is configured to substitute data bits from said speech-to-text converter within a bit stream from said voice encoder.

7. The communications system according to claim 1 wherein said multiplexer is configured to append data bits from said speech-to-text converter to a bit stream from said voice encoder.

8. The communications system according to claim 1 wherein each of said first and second communications devices comprises a voice-only communications device.

9. A mobile wireless communications device comprising:
a transmitter section and a receiver section cooperating therewith, said transmitter section comprising
an audio input transducer,
a voice encoder coupled to said audio input transducer,
a speech-to-text converter coupled to said audio input transducer,
a multiplexer coupled to said voice encoder and to said speech-to-text converter and configured to multiplex a digital speech message and a corresponding text message into a multiplexed signal, and
a wireless transmitter coupled to said multiplexer and operable to transmit the multiplexed signal; and
said receiver section comprising
a wireless receiver configured to receive the multiplexed signal from said wireless transmitter,
a de-multiplexer coupled to said wireless receiver and operable to de-multiplex the multiplexed signal into the speech message and the corresponding text message,
a voice decoder coupled to said de-multiplexer,
an audio output transducer coupled to said voice decoder,
a text processor coupled to said de-multiplexer,
a display coupled to said text processor and configured to display the corresponding text message in synchronization with the speech message, and
a memory coupled to said text processor for storing the text message,
said text processor being configured to later display the stored text message.

10. The mobile wireless communications device according to claim 9 further comprising a housing containing said transmitter section and said receiver section.

11. The mobile wireless communications system according to claim 9 wherein said transmitter section further comprises a language converter coupled between said speech-to-text converter and said multiplexer.

12. The mobile wireless communications system according to claim 9 wherein said receiver section further comprises a language converter coupled between said text processor and said display.

13. The mobile wireless communications system according to claim 9 wherein said multiplexer is configured to substitute data bits from said speech-to-text converter within a bit stream from said voice encoder.

14. The mobile wireless communications system according to claim 9 wherein said multiplexer is configured to append data bits from said speech-to-text converter to a bit stream from said voice encoder.

15. A method for operating a communications system comprising a first communications device and a second communications device cooperating therewith, the method comprising:
operating the first communications device to perform at least
encoding an analog speech message to a digital speech message,
converting the analog speech message into a corresponding text message,
multiplexing the digital speech message and the corresponding text message into a multiplexed signal, and
wirelessly transmitting the multiplexed signal; and
operating the second communications device to perform at least
wirelessly receiving the multiplexed signal,
de-multiplexing the multiplexed signal into the digital speech message and the corresponding text message,
decoding the speech message for an audio output transducer,
operating a text processor on the corresponding text message for display, with the corresponding text message being displayed in synchronization with the speech message output by an audio output transducer,
storing the text message, and
operating the text processor to display the stored corresponding text message.

16. The method according to claim 15 wherein operating the first communications device further comprises converting the corresponding text message into a different language.

17. The method according to claim 15 wherein operating the second communications device further comprises converting the corresponding text message into a different language for display.

18. The method according to claim 15 wherein multiplexing the digital speech message and the corresponding text message by the first communications device comprises substituting data bits from the corresponding text message within a bit stream of the digital speech message.

19. The method according to claim 15 wherein multiplexing the digital speech message and the corresponding text message by the first communications device comprises appending data bits from the corresponding text message to a bit stream of the digital speech message.

20. The method according to claim 15 wherein each of said first and second communications devices comprises a voice-only communications device.

* * * * *